Nov. 3, 1964   A. C. PYRAK   3,154,869
LOAD HANDLING DEVICE
Filed Jan. 18, 1963   2 Sheets-Sheet 1
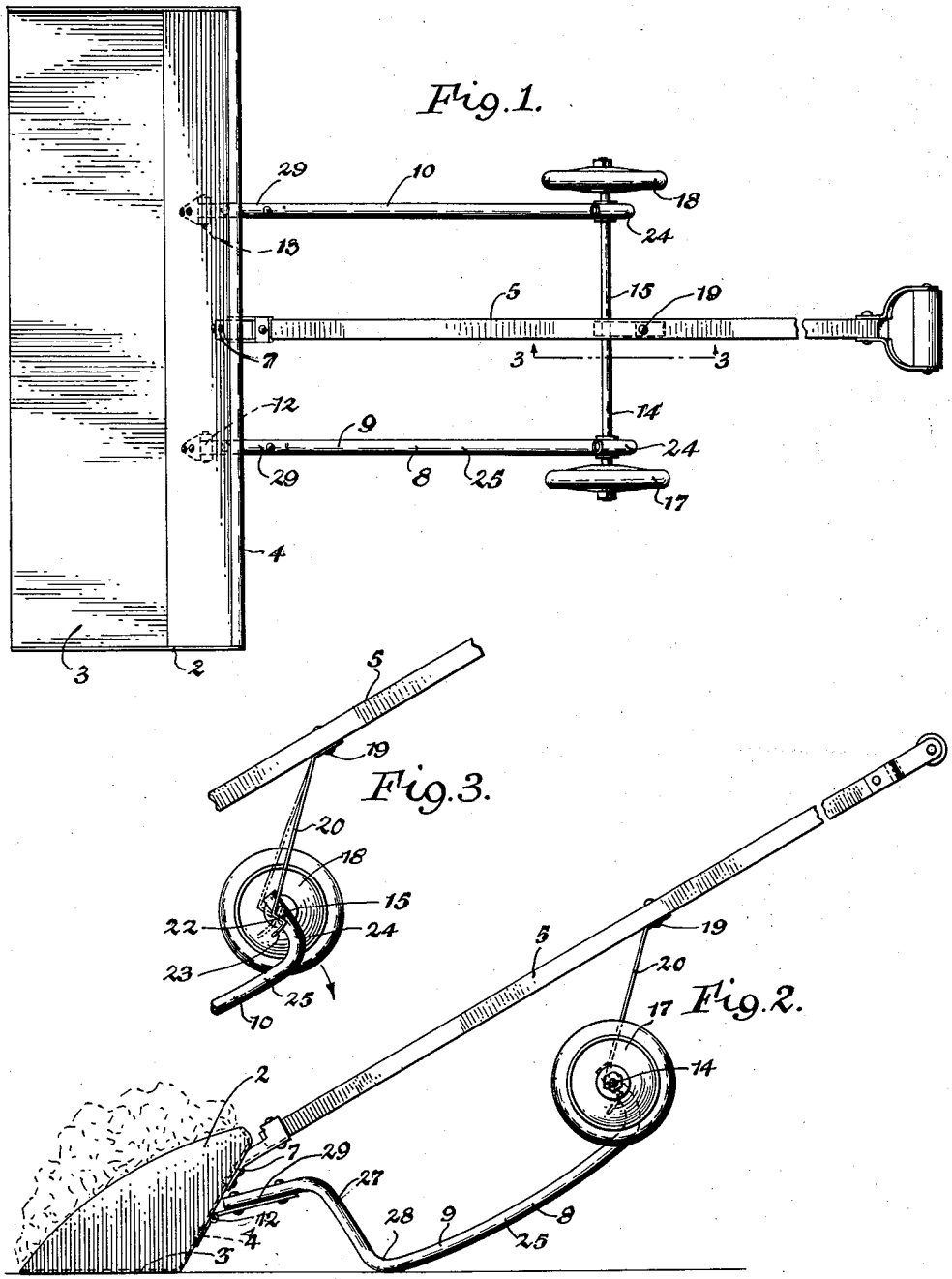
INVENTOR.
ANTHONY C. PYRAK
BY
Bean, Brooks, Buckley + Bean
ATTORNEYS

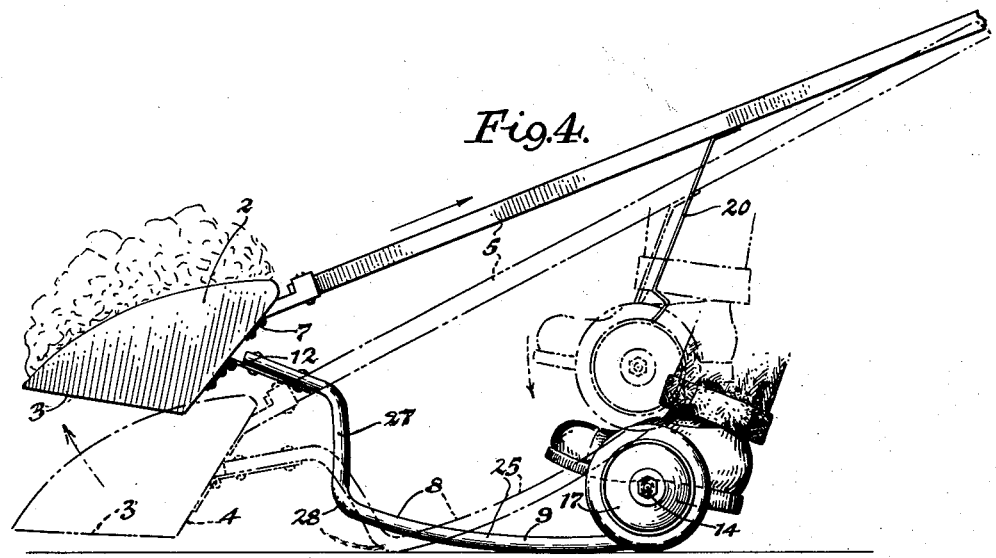
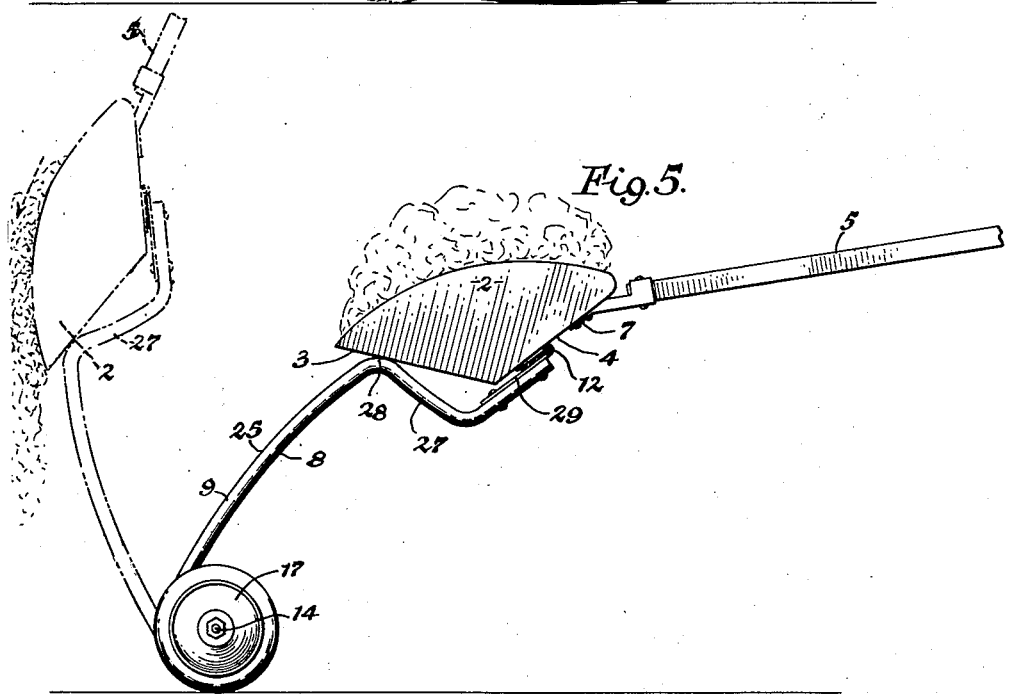

United States Patent Office 3,154,869
Patented Nov. 3, 1964

3,154,869
LOAD HANDLING DEVICE
Anthony C. Pyrak, 208 Fairways Blvd., Buffalo, N.Y.
Filed Jan. 18, 1963, Ser. No. 252,371
6 Claims. (Cl. 37—130)

This invention relates to a load handling devices and more particularly to a shovel having a cradle assembly for lifting and supporting a load. One object of the invention is to provide a shovel that can be used for the lifting and transporting of snow, or other material such as dirt or leaves.

Another object is to provide a shovel whereby a relatively large amount of material may be easily elevated from the ground and supported on a wheeled cradle assembly for movement to a desired dumping area.

Another object is to provide a fulcrumed shovel for easy handling of material.

Other objects and features of the invention will more fully appear hereinafter.

In the drawings:

FIG. 1 is a plan view of my invention, shown in the form of a snow shovel.

FIG. 2 is a side view of the shovel showing its relation to the ground or supporting surface after having been pushed forward to accumulate a load of snow.

FIG. 3 is a sectional view taken on line 3—3 of FIG. 1 and illustrating a portion of the handle, axle, the strap connecting the handle and axle, and one wheel.

FIG. 4 is a side view illustrating with broken lines the load gathering scoop lifted just clear of the supporting surface; and illustrating with solid lines, the scoop lifted to a higher elevation.

FIG. 5 is a side view, illustrating with solid lines the position assumed by the scoop when fully raised and supported by the cradle assembly for rolling movement; and illustrating with broken lines the parts with scoop in unloading position.

Referring now to the drawings, 2 designates a load gathering scoop preferably made of sheet metal or other substantially rigid material and which has a bottom or forward portion 3 and a rear portion 4. An elongated rearwardly extending handle 5 is rigidly attached to the scoop at 7.

An elongate cradle assembly 8 has spaced rails 9 and 10, having their forward ends pivotally attached to the rear portion 4 of the scoop at 12 and 13 respectively while their rearward ends support an axle 14.

The axle 14 provide a central portion 15 located between the end of rails 9 and 10, and spindle portions extending beyond the rails for mounting wheels 17 and 18.

Rigidly attached to the underside of handle 5 at 19 is a downwardly extending strap 20, made of spring metal and having a rearwardly extending portion 22 and a forwardly and downwardly extending end portion 23. The central portion 15 of the axle and the portions 22 and 23 of strap 20 are so positioned that axle portion 15 normally rests on the top of strap portion 22, but that the axle can be disengaged from the strap by pressing downwardly with one's foot on axle portion 15 while holding the handle 5 still, or while pulling upwardly on the handle. After being disengaged the parts can be re-engaged by lowering the handle until end 23 of the strap contacts the top of axle portion 15 whereupon further downward movement of the handle will force the lower end of the strap forward until the axle rests on strap portion 22. The foregoing arrangement makes it possible to lift the free end of the handle and also lift the cradle assembly when desired, while permitting disengagement of the handle and attached strap from the axle for a purpose to be described.

The rails 9 and 10 of the cradle assembly 8 may be made of any desired material but are preferably made of tubes, and they are identical in shape, each having upturned ends 24 supporting the axle 14, rocker portions 25 extending from points of substantial tangency adjacent the wheels, toward the scoop 2, and step portions 27 hingedly joining the rocker portions with the scoop at 12 and 13.

The fulcrum point or juncture 28 of the step portions and the rocker portions is so dimensioned as to normally engage with or rest upon a supporting surface such as a pavement, with the bottom 3 of the scoop 2 also engaged with such surface, and with the wheels 17 and 18 elevated with respect to such surface. The position, just described, of the scoop, the cradle assembly and the wheels may be designated as the first position of the cradle assembly.

In the operation of the device, and while in the position shown in FIG. 2, the device is pushed forward, or to the left, on the supporting surface, by pushing on handle 5, until a desired load has been accumulated in the scoop, at which time, when it may be desired to elevate the loaded scoop, the operator presses downwardly on axle portion 15 with one foot while at the same time pulling rearwardly on handle 5 as indicated by arrows in FIG. 4. The result of the foregoing operation is to rock the cradle assembly 8 and start to elevate the loaded scoop 2 with a minimum of physical power or effort being required.

A continued downward pressure with the foot and rearward pull on the handle, will bring wheels 17 and 18 into contact with the supporting surface, after which a continuing pull rearward on the handle will further elevate the scoop and forward portions of the cradle assembly until the scoop is drawn backward over the top dead center of the cradle assembly to a second position of the cradle assembly with the juncture 28 of the step portion and the rocker portion of the cradle assembly supporting the bottom 3 of scoop 2 as illustrated in solid lines in FIG. 5. It will also be observed that in the position just described the wheels 17 and 18 are located forwardly of the center of gravity of the loaded scoop. While in this position the device can be wheeled to any desired place.

It will also be evident that if the end portions 29 of step portions 27, adjacent pivotal attachment 12 and 13 are so arranged as to contact the scoop rear portion 4 below the pivotal attachments 12 and 13, that in such case support of the bottom 3 of the scoop would not be necessary.

When a desired dumping area has been reached the scoop can be loaded by merely lifting on handle 5 until the device has substantially assumed the position shown in broken lines in FIG. 5.

It will be readily seen that by merely lowering the free end of handle 5 from the broken line position shown in FIG. 5 the device can again assume the condition shown in FIGS. 1 and 2.

The device is so constructed that a minimum of physical effort is required to elevate and transport a load.

While only the preferred form of the invention has been illustrated and described herein, such form may be modified without departing from the spirit of the invention or the scope of the appended claims.

What is claimed is:

1. A load handling device comprising, in combination,
   a load gathering scoop having a handle attached thereto and extending rearwardly therefrom,
   an elongate cradle assembly pivotally attached at one end thereof to said scoop,
   said cradle assembly being movable between a first position extending rearwardly from said scoop and underlying said handle and a second position oblique to said handle in underlying and supporting relation to said scoop, said cradle assembly including a step portion extending rearwardly and downwardly from the point of pivotal attachment between cradle and scoop to engage with a supporting surface simultaneously with said scoop with the cradle assembly in said first position thereof, and a rocker portion extending upwardly as well as rearwardly from such point of supporting surface engagement, and wheel means attached to that end of said rocker portion remote from said scoop.

2. The load handling device of claim 1 further characterized by:

said rocker portion having spaced rails, an axle for said wheel means carried between said rails, and said axle having a portion adapted to receive an operator's foot pressure.

3. The load handling device of claim 1 further characterized by:

said rocker portion having spaced rails, an axle for said wheel means carried between said rails, and said handle having a downwardly extending spring strap adapted for releasable engagement adjacent its free end with said axle.

4. A load handling device comprising, in combination, a load gathering scoop having a handle attached thereto and extending rearwardly therefrom, an elongate cradle assembly pivotally attached at one end thereof to the rear of said scoop, said cradle assembly being movable between a first position extending rearwardly from said scoop and underlying said handle and a second position oblique to said handle in underlying relation to said scoop, said cradle assembly including an L-shaped step portion extending rearwardly from the scoop and then downwardly to engage with a supporting surface simultaneously with said scoop with said cradle assembly in said first position thereof, and a rocker portion extending upwardly as well as rearwardly from such point of supporting surface engagement, and the length of said rearwardly extending portion of the L-shaped step portion, as aforesaid, being greater than the distance between its point of attachment to the scoop and the bottom of the scoop, and wheel means attached to that end of said rocker portion remote from said scoop.

5. The load handling device of claim 4 further characterized by:

said rocker portion having spaced rails, an axle for said wheel means carried between said rails, and said axle having a portion adapted to receive an operator's foot pressure.

6. The load handling device of claim 4 further characterized by:

said rocker portion having spaced rails, an axle for said wheel means carried between said rails, and said handle having a downwardly extending spring strap adapted for releasable engagement adjacent its free end with said axle.

References Cited in the file of this patent

UNITED STATES PATENTS

| 340,955 | Odin | Apr. 27, 1886 |
| 418,339 | Mott | Dec. 31, 1889 |
| 2,441,449 | Shaw | May 11, 1948 |
| 2,895,238 | Long | July 21, 1959 |
| 3,028,695 | Westby | Apr. 10, 1962 |

FOREIGN PATENTS

| 49,820 | Switzerland | Dec. 3, 1909 |
| 978,090 | France | Apr. 9, 1951 |